Sept. 11, 1928. J. RICE Re. 17,080

ELEVATOR PLATFORM

Original Filed July 14, 1926

Inventor
Joseph Rice
by Fabel & Banning Attys.

Reissued Sept. 11, 1928.

Re. 17,080

UNITED STATES PATENT OFFICE.

JOSEPH RICE, OF CHICAGO, ILLINOIS, ASSIGNOR TO ELEVATOR COMPANY OF AMERICA, OF CHICAGO, ILLINOIS A CORPORATION OF ILLINOIS.

ELEVATOR PLATFORM.

Original No. 1,623,977, dated April 12, 1927, Serial No. 122,367, filed July 14, 1926. Application for reissue filed June 25, 1928. Serial No. 288,212.

My invention relates to elevator platforms, and more particularly to means whereby such platforms may be utilized to effect a governing or controlling influence over car control mechanism.

In one of its forms, my invention is particularly applicable to elevators of the type which are operated by the user. These elevators are generally of the push-button type so that the operation of a push button corresponding to a floor of the building will automatically cause the car to move to that particular floor and stop there. In apparatus of this kind, there is a door for the hatchway and there is also a door provided upon the car, and the control mechanism is so arranged that the user is unable to bring about a movement of the car unless both the hatch door and the car door are closed. This is done in order to prevent accidents. Now it sometimes happens that when the user leaves the car, he forgets to close the door, but he does close the hatchway door. Under such circumstances, it would be impossible for any prospective user desiring to use the car to bring the car to another floor, as the car control apparatus is left inoperative because of the open car door.

To avoid this contingency, my invention contemplates a movable platform within the car platform which is so arranged that when one or more persons stand upon this platform, an electric switch mechanism, which is in parallel with the switch mechanism of the car door, is open, so that before the user within the car can operate the car, it is necessary for both the car door and hatch door to be closed. Should the car, however, be empty and standing at a floor, then the movable platform moves back into its circuit-closing position so that the switch mechanism controlled by this platform, and which is in parallel with the switch mechanism controlled by the car door, will permit operation of the car from another floor so long as the hatch doors are closed. In other words, in order for the car to operate, it is essential in all instances that the hatch door be closed, and, as a second condition, the car must either be unoccupied or the car door must be closed.

My invention concerns itself with new and improved means for bringing about the proper movement of the car platform. My invention contemplates the provision of such means which will require the least amount of movement and which at the same time will provide a platform having the necessary stability so as not to provide a platform which is uncomfortable for the occupants of the car. The movements of my platform are so slight as to be hardly noticeable and the recoil movement is of such a nature that it is smooth and even.

I will describe one form which my invention may take more in detail by referring to the accompanying drawing, in which—

Figure 1:
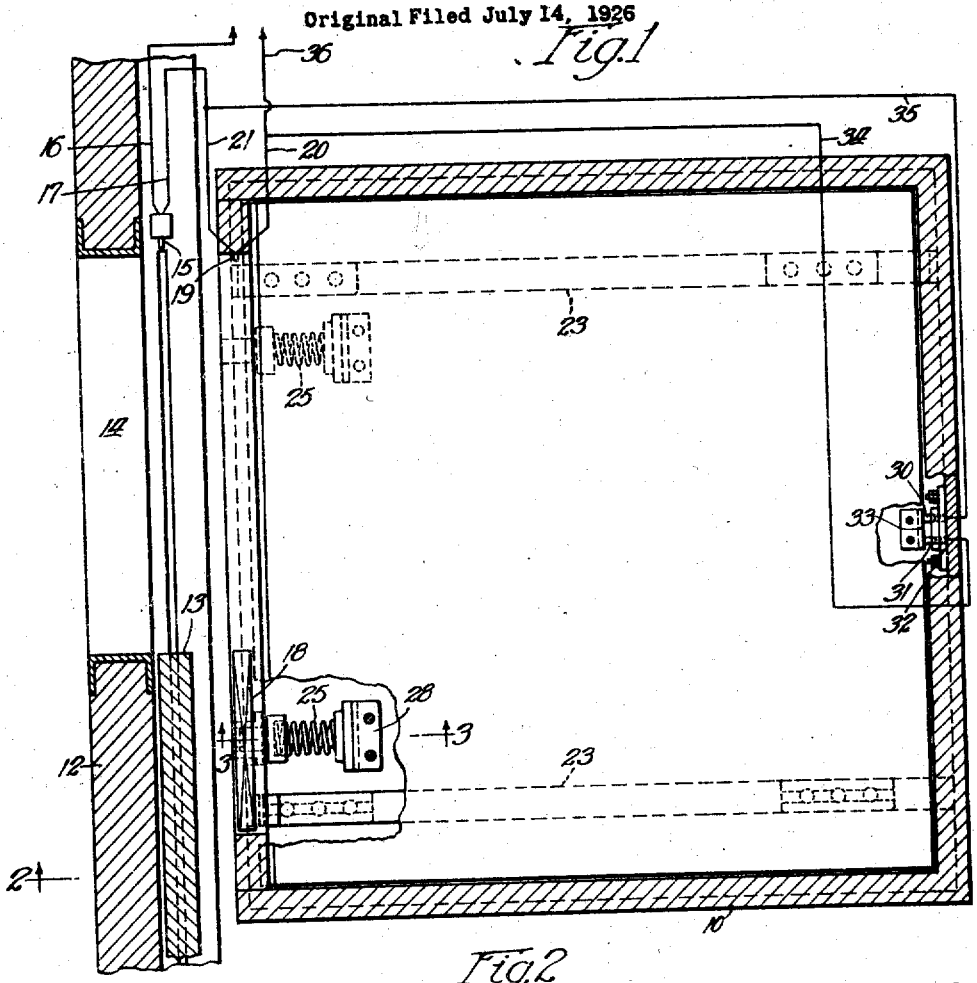
Fig. 1 is a top view of a platform constructed in accordance with my invention, a car and hatchway framework being shown in section, and certain portions of the platform being broken away more clearly to reveal features of construction.

In accordance with my invention, I provide a car framework 10 consisting preferably of four sides, top and bottom, the bottom portion of the framework being shown at 11. The car is in a hatchway surrounded by the hatch wall 12, and a hatch door 13 controls the entrance through the door opening 14. The hatch door 13 is designed to short-circuit a pair of contacts, of which one, the contact 15, is shown whenever this hatch door 13 is in its closed position. The closure of the circuit through the contacts 15 closes a circuit through wires 16 and 17. The co-operation of these wires with others will presently be explained.

Figure 2:
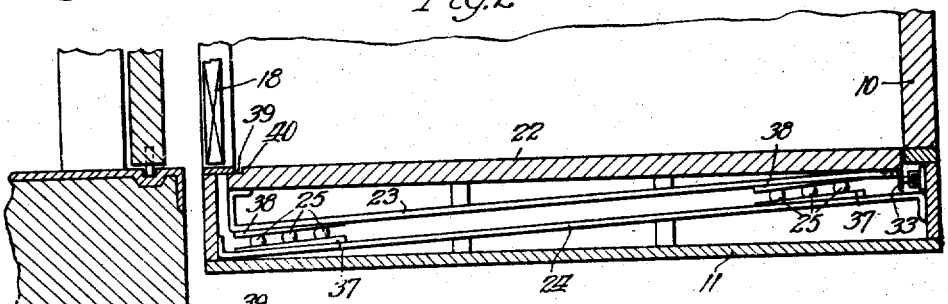
Fig. 2 is a sectional view along lines 2 in Fig. 1.
Figure 3:
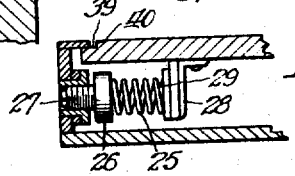
Fig. 3 is a sectional view along lines 3—3 of Fig. 1.

The car also has a collapsible door 18, which collapsible door is shown in its open position in Fig. 1, but which, when closed, is adapted to close circuit through a similar pair of contacts 19, of which one, the contact 19, is shown. The closure of the circuit across the contacts 19 closes a circuit across the wires 20 and 21, all as will be further explained. Within the car there is provided a movable platform 22, which movable platform at its lower portion preferably has a pair of inclined frames 23. These inclined frames preferably are arranged in parallel relation to similarly inclined frames 24 provided upon the car framework. Interposed between the two frameworks 23 and 24 are provided balls 25, which balls form a bearing so that the framework 23 may roll over the framework 24. By virtue of this construction, it will be noted that, if a weight is placed upon the platform 22, the said platform will, by reason of this construction, move downwardly and to the left (Fig. 2). Such action of the platform would be against the pressure of the springs 25. These springs are interposed between the car framework and the platform and are of such a strength as to hold the platform 22 in the position shown in Fig. 2 unless the weight of one person is upon said car platform.

One extremity of the spring 25 is mounted in a cup 26 which is adjustable upon the car framework through the agency of the screw 27. The other extremity of the spring abuts against a shelf 28 extending downwardly from the platform 22, a suitable lug 29 confining this spring to its proper position.

Now, whenever the platform is in the position shown in Fig. 1, a circuit is closed across two spring backed contacts 30 and 31 which are insulatingly mounted upon the car framework. The construction and arrangement of the spring fingers 15 and 19 is similar to that disclosed for the spring backed fingers 30 and 31. These spring backed fingers are insulatingly mounted in a support 32. The platform 22 carries a contact plate 33 which, when in the position in Figs. 1 and 2, short-circuits the fingers 30 and 31 so as to close circuit across the wires 34 and 35. Now, whenever a weight is placed upon the platform equivalent to that of the lightest person who would ever be supposed to operate the car, then the platform 22 moves downwardly against the action of the springs 25 and opens the circuit through the spring backed fingers 30 and 31. The wires 34 and 35 are connected in parallel with the wires 20, 21, as clearly apparent. The conductor 17 is then connected to the conductors 21 and 35. The conductor 16 extends away from the car and controls suitable mechanism which permits or prevents the operation of the car. A further conductor 36, which is joined to the conductors 20 and 34, extends in parallel with the conductor 16. Now, the arrangement is such that the circuit across conductors 16 and 36 must be completed before the car can be operated, and under these conditions a circuit must be completed through the spring fingers 15 and either the spring fingers 19 or the spring fingers 30 and 31, all as explained in the introductory part of this application.

I find that I obtain exceptionally good results if I provide runways 37 and 38 for the balls 25, which have a slightly increased inclination to the inclination of the frameworks 23 and 24. I get a smooth and more positive action. A ledge 39 is provided upon the car platform which limits the movement of the car platform in response to the actuation of the springs 25. A similar ledge at right angles 40 limits the downward movement of the platform by reason of a weight being placed thereon.

By referring to Fig. 2, therefore, it will be seen that each set of frameworks 23 and 24 has two aligned runway sections, each runway section consisting of the elements 37 and 38 in this particular instance. It will also be apparent that the planes of the inclined surface of the element 38 at the right hand section of Fig. 2 is non-identical with the planes of the inclined left hand section 38, as shown in Fig. 2. These two planes are parallel, but they are not identical, as already explained.

From what has been thus described, the nature of my invention will be readily clear to those skilled in the art, and it will also be understood that modifications may be made without departing from the spirit of my invention. Having, however, described one form which my invention may take, what I desire to claim and secure by Letters Patent is:

1. A car having a framework, a movable floor carried by said framework, car control mechanism responsive to the position of said floor, and means for movably carrying said floor on said framework, said means including an inclined runway.

2. A car having a framework, a movable floor carried by said framework, car control mechanism responsive to the position of said floor, means for movably carrying said floor on said framework, said means including an inclined runway, and a recoil spring tending to move said framework upwardly upon said runway.

3. A car having a framework, a movable floor carried by said framework, car control mechanism responsive to the position of said floor, means for movably carrying said floor on said framework, said means including an inclined runway, and stops interposed between said car framework and said floor to limit the movement of said floor in both directions.

4. A car having a framework, a movable floor carried by said framework, car control mechanism responsive to the position of said floor, and means for movably carrying said floor on said framework, said means including a pair of parallel inclined runways and balls interposed between said runways.

5. A car having a framework, a movable floor carried by said framework, car control mechanism responsive to the position of said floor, means for movably carrying said floor on said framework, said means including a pair of parallel inclined runways and balls interposed between said runways, and a recoil spring tending to move said framework upwardly upon said runway.

6. A car having a framework, a movable floor carried by said framework, car control mechanism responsive to the position of said floor, and means for movably carrying said floor on said framework, said means comprising a pair of aligned runway sections whose planes of inclination are non-identical but parallel.

7. In combination, a framework, a movable floor carried by said framework, electric circuit control mechanism responsive to the position of said floor, and means for movably carrying said floor on said framework, said means including an inclined runway.

8. In combination, a framework, a movable floor carried by said framework, electric circuit control mechanism responsive to the position of said floor, means for movably carrying said floor on said framework, said means including an inclined runway and a recoil spring tending to move said frame upwardly upon said runway.

9. In combination, a framework, a movable floor carried by said framework, electric circuit control mechanism responsive to the position of said floor, means for movably carrying said floor on said framework, said means including an inclined runway, and stops provided upon said framework to limit the movement of said floor in both directions.

10. In combination, a framework, a movable floor carried by said framework, electric circuit control mechanism responsive to the position of said floor, means for movably carrying said floor on said framework, said means including an inclined runway, a recoil spring tending to move said frame upwardly upon said runway, and stops provided upon said framework to limit the movement of said floor in both directions.

11. In combination, a framework, a movable floor carried by said framework, means including an inclined runway for movably carrying said floor on said framework, said means operating to move said floor laterally in one direction as weight is placed upon said floor and in the opposite direction as weight is removed from said floor, an electric circuit, and means responsive to the position of said floor to open and close said circuit.

12. In combination a framework, a movable floor carried by said framework, means including an inclined runway for movably carrying said floor on said framework, said means operating to move said floor laterally in one direction as weight is placed upon said floor and in the opposite direction as weight is removed from said floor, an electric circuit, and control contacts in said circuit carried by said framework and said floor movable into circuit closing position as weight is removed from said floor and out of circuit closing position as weight is added to said floor.

JOSEPH RICE.